(12) United States Patent
Okuda et al.

(10) Patent No.: US 7,044,372 B2
(45) Date of Patent: May 16, 2006

(54) GUIDE INFORMATION PROVIDING APPARATUS AND PROGRAM

(75) Inventors: Shizue Okuda, Kanagawa (JP); Koji Ihara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/936,344

(22) Filed: Sep. 8, 2004

(65) Prior Publication Data

US 2005/0051623 A1 Mar. 10, 2005

(30) Foreign Application Priority Data

Sep. 9, 2003 (JP) .......................... P2003-317481

(51) Int. Cl.
*G06F 17/00* (2006.01)
(52) U.S. Cl. ...................... 235/384; 235/375
(58) Field of Classification Search ............... 235/382, 235/381, 383, 385, 492, 472.1, 472.02, 472.03, 235/384, 375; 701/201, 211, 200, 117; 340/995.13
See application file for complete search history.

(56) References Cited

U.S. PATENT DOCUMENTS 5,948,040 A * 9/1999 DeLorme et al. .......... 701/201
6,926,203 B1 * 8/2005 Sehr ........................... 235/492
2002/0188527 A1 * 12/2002 Dillard et al. ................ 705/27
2003/0132298 A1 * 7/2003 Swartz et al. .......... 235/472.02
2005/0027437 A1 * 2/2005 Takenaga et al. ........... 701/117
2005/0049900 A1 * 3/2005 Hirose et al. ................... 705/6
2005/0093720 A1 * 5/2005 Yamane et al. ......... 340/995.13
2005/0096839 A1 * 5/2005 Nakano et al. ............. 701/200
2005/0131631 A1 * 6/2005 Nakano et al. ............. 701/200
2005/0149253 A1 * 7/2005 Nambata .................... 701/201

* cited by examiner

*Primary Examiner*—Thien M. Le
(74) *Attorney, Agent, or Firm*—Finnegan, Henderson, Farabow, Garrett & Dunner, L.L.P.

(57) ABSTRACT

A guide information providing apparatus, and a program, in which a marker indicating a point of interest for a user is displayed on a map image, and in which, even in case the point of interest is located in a complex of establishments, the detailed position of the point of interest in such complex of establishments may be demonstrated. A guide program may display a marker for a point specified by the latitude/longitude for the point of interest when a map image is displayed, while displaying a marker for a point specified by the floor and the coordinate of the point of interest information when an image in the complex of establishments is displayed.

6 Claims, 17 Drawing Sheets

GUIDE INFORMATION PROVIDING APPARATUS AND PROGRAM

BACKGROUND OF THE INVENTION

1. Field of the Invention

This invention relates to a guide information providing apparatus, and a program, for electronically providing a map image and the relevant information pertaining to a point as a subject of interest for a user, such as a site or establishment.

2. Description of Related Art

As an apparatus for electronically providing the map image, a navigation device for a trip or a car-laden navigation device has become popular. This navigation device provides not only a map image but also the information pertinent to the sites or establishments the user is possibly interested in, such as establishments, stores, sight-seeing places and sight-seeing spots (Point-Of-Interest (POI) information). In the conventional navigation devices, a link is formed between the POI information and the map image and a marker is displayed on the map image to apprise the user of the sites of the stores or establishments.

In a complex of establishments, made up by a large number of stores and establishments, such as building, department store, shopping mall or shopping center, there may exist stores provided as the POI information. In the conventional navigation device, when the sites of the stores in the complex of establishments are provided to the user, it was only possible to present the map image up to a location of the complex of establishments, with the result that the user is unable to visually grasp the detailed site of the store in the complex of establishments.

SUMMARY OF THE INVENTION

It is an object of the present invention to provide a guide information providing apparatus, and a program, in which a point of interest for a user, such as establishment or site, is indicated by a marker on a map image, and in which, even if the location of the point of interest for the user is in the complex of establishments, the detailed location in the complex of establishments may visually be presented to the user.

In one aspect, the present invention provides a guide information providing apparatus comprising data holding means for storage or acquisition from outside over a network of a map image in which a coordinate position on an image is correlated with the latitude and the longitude, an image in a complex of establishments, as a guide view image for each floor of the complex of establishments, and the POI information, stating the information pertinent to a sites and an establishment, display means for demonstrating the map image, the image in the complex of establishments and the POI information, and control means for controlling the contents demonstrated on the display means.

The POI information states the name and the latitude/longitude of the site and the establishment; the POI information, pertinent to the establishment present in the complex of establishments, while also stating the complex of establishments where the establishment exists, the floor where the establishment exists, and the coordinate on the image in the complex of establishments where the establishment exists.

The control means displays the map image and an image in the complex of establishments responsive to input control from a user, while also displaying a marker for a point on the map image specified by the latitude/longitude stated in the POI information selected, when the map image is displayed. The control means also displays a marker for a point on the image in the complex of establishments specified by the floor and the coordinates stated in the POI information selected, when the image in the complex of establishments is displayed.

In another aspect, the present invention provides a computer program for displaying for a user a map image in which a coordinate position on an image is correlated with the latitude and the longitude, an image in a complex of establishments, as a guide view image for each floor of the complex of establishments, and the POI information, stating the information pertinent to a site and an establishment. The computer program is stored in an information storage medium or supplied from outside over a network. The POI information states the name and the latitude/longitude of the site and the establishment. The POI information, pertinent to the establishment present in the complex of establishments, further states the complex of establishments where the establishment exists, the floor where the establishment exists, and the coordinate on the image in the complex of establishments where the establishment exists. The map image and an image in the complex of establishments are displayed responsive to input control from a user. A marker is displayed for a point on the map image specified by the latitude/longitude stated in the POI information selected, when the map image is displayed. A marker is displayed for a point on the image in the complex of establishments, as specified by the floor and the coordinates stated in the POI information selected, when the image in the complex of establishments is displayed.

With the guide information providing apparatus and program, according to the present invention, an image in the complex of establishments, as the guide view image of each floor of the complex of establishments, is displayed. In the POI information, pertinent to an establishment present in the complex of establishments, the complex of establishments, where there exists the establishment, the floor where there exists the establishment and the coordinates on the image in the complex of establishments, are stated In case the map image is displayed, a marker is displayed for a point on the map image specified by the latitude/longitude stated in the selected POI information. In case an image in the complex of establishments is displayed, a marker is displayed for the floor stated in the selected POI information and for a point on the image in the complex of establishments as specified by the coordinates.

With the guide information providing apparatus and program, according to the present invention, it is possible to demonstrate a point of interest for the user, such as establishment or site, by a marker. Moreover, even in case the point of interest is in a complex of establishments, the detailed location in the complex of establishments may be visually presented to the user.

DESCRIPTION OF THE PREFERRED EMBODIMENTS

A guide information providing program, as application software for a computer, as an embodiment of the present invention, is explained. The guide information providing program is an application program for electronically presenting the information pertinent to sites and establishments, such as stores, establishments, sites, sightseeing places, hotels, restaurants, meeting spots, or various landmarks, in a manner readily comprehensible to the user. These sites or establishments are referred to below as Points Of Interest (POIs). The guide information providing program according to the present invention may be installed and run on a Personal Digital Assistant (PDA) which is a pen-input type small-sized computer. Thus, the program may be carried about by a user and utilized on a site of destination in lieu of a book, such as a map or a guide book. As the best mode for carrying out the present invention, a case where the guide information providing program according to the present invention is used as it is installed on a PDA, is explained.

PDA

Figure 1:
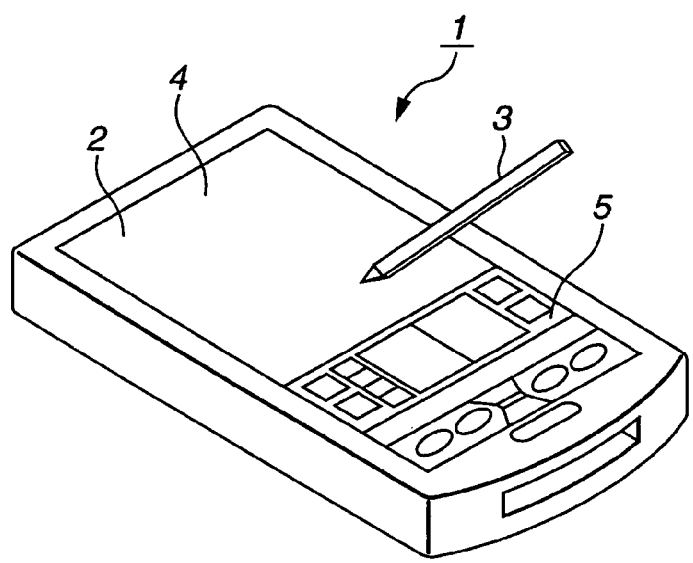
FIG. 1 is a perspective view of a PDA.
Figure 2:
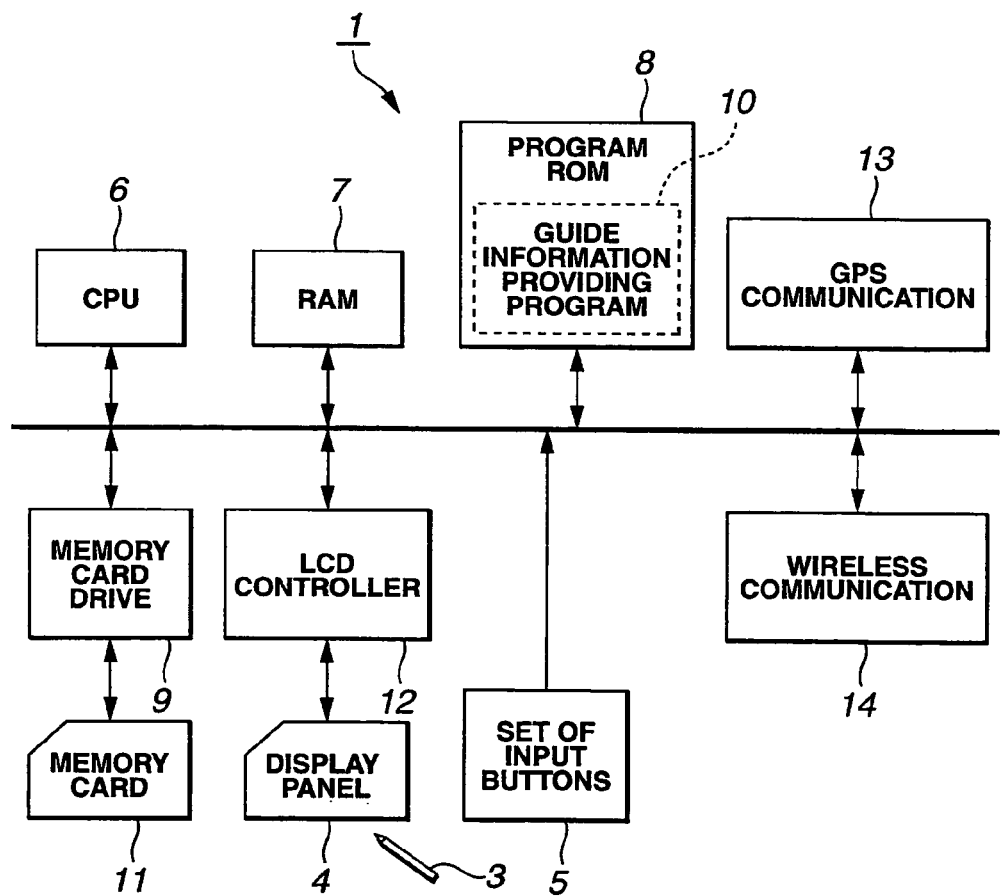
FIG. 2 shows an inner structure of the PDA.

The PDA, on which is to be installed the guide information providing program, according to the present invention, is briefly explained. FIGS. 1 and 2 depict a perspective view and a diagram showing an inner structure of the PDA, respectively.

The PDA 1 is made up by a main body unit 2 and an input pen 3, as a pen-like inputting device, as shown in FIG. 1. The main body unit 2 is of the size of the palm of a hand of a human being and of the weight that can be held with one hand. The main body unit 2 includes a display panel 4, such as a touch-panel type LCD, and a set of input buttons 5. The display panel 4 displays the variable information and the graphical user interface (GUI) for the user. The display panel 4 accepts input operations on the GUI via input pen 3. The PDA 1 performs various operations and control based on input operations for the display panel 4 and the set of the input buttons 5.

Referring to FIG. 2, the PDA 1 includes a central processing unit (CPU) 6, for performing control and calculation processing, a RAM 7, as a work area of the CPU 6 and as a transient data storage area, a program ROM 8, in which an operation system or an application program is stored, a memory card drive 9, in which a memory card 11 as a card type small-sized IC memory device is loaded and which records and/or reproduces the information for the memory card 11, and an LCD controller 12 for exercising control on the display panel 4. The PDA 1 includes a GPS (global positioning system) communication unit 13 and a wireless communication unit 14. The GPS communication unit 13 receives a signal from a GPS satellite and detects a current position (latitude and longitude). The wireless communication unit 14 has wireless communication with another apparatus in accordance with e.g. the IEEE802 system. The GPS communication unit 13 may be omitted and the current position information may be acquired from an external GPS communication apparatus. For example, the current position information may be acquired from an external GPS in accordance with e.g. the IEEE802 system, such as Blue-Tooth.

With the above-described PDA 1, a guide information providing program 10, embodying the present invention, is installed in a program ROM 8. In the memory card 11, a variety of data, referenced and updated by the guide information providing program 10 (map images, in-hall view images or POI-related information) are stored. The CPU 6 boots the guide information providing program 10 in the program ROM 8 and, responsive to the program code in the guide information providing program 10 and the user input, demonstrates data in the memory card 11 and various GUI on the display panel 4. The GPS communication unit 13 acquires the current position information (latitude and longitude) of the PDA 1 for reference by the guide information providing program 10. The PDI 1 transmits/receives data with outside, over a network, using the GPS communication unit 13, to update the variable data in the memory card 11, such as the map information, in-hall view images or the POI-related information, to the latest information.

The PDA 1 executes the guide information providing program 10 of the present invention, by the inner devices thereof performing the above operations, for electronically presenting the information pertinent to the POI (Point-Of-Interest) to the user.

Reference Data of Guide Information Providing Program

The data referenced by the guide information providing program 10 is now explained.

In the guide information providing program 10 of the present invention, data stating the information pertinent to POI (referred to below as "POI-related information"), data corresponding to the digitized "map information" and data corresponding to digitized "in-hall view", are supervised in the memory card 11 as a database. These data are referenced to present the POI-related information to the user.

The POI-related information is the information pertinent to the POI (sites or establishments). The guide information providing program 10 registers one item of the POI-related information for one POI. The POI-elated information states at least the "name" of the POI, and the "latitude and longitude" of the POI. The POI-related information also states, as necessary, the category of the POI (such as, for example, the restaurants, shops or museums), more detailed sub-category in the category, such as Japanese cooking or Chinese cooking when the category is the restaurant, the textural explanation of the POI, photos introducing the POI, catch copies of the POI, the names of the territory where the POI is present, and so forth.

There are also cases where the POI is located in a complex of establishments composed of a large number of stores and establishments, such as a building, a department store, a shopping mall or a shopping center. The complex of establishments is referred to below as a "representative establishment". In such case, the POI-related information includes, in addition to the above information, the "name of the representative establishment" encompassing the POI, the "story number" of the POI in the representative establishment, such as lower ground, first floor, second floor and so forth, and the "XY coordinate position on the in-hall view image" of the POI. Meanwhile, there are cases where the POI is present across plural floors in the representative establishment, like a so-called maisonette. In this case of the POI, the "story number" of the POI states plural floors.

The POI-related information is written e.g. in the XML (eXtensible Mark-up Language) and is stored in the memory card 11.

The map information is a schematic two-dimensional representation of roads, buildings, rivers etc. of each territory. The guide information providing program 10 manages and holds plural map pictures from one territory to another and from one scale ratio to another. In each image data, the XY coordinate position on the image is correlated with the latitude and longitude. For example, each map picture correlates the XY coordinate position on the image with the latitude and the longitude by prescribing the relation between the image displaying direction and the orientation, the latitude and the longitude of a center position of the image, and the scale ratio of the image. By this correlation, a marker, such as an icon, may be represented at particular latitudinal and longitudinal positions on the displayed map image. For example, since the latitude and the longitude of the POI are stated in the above-mentioned particular latitudinal and longitudinal positions on the map image, a marker indicating the particular POI position may be demonstrated on the map image. The above-described map image is formed into data in e.g. the GIF form and stored as such in the memory card 11.

Figure 3:
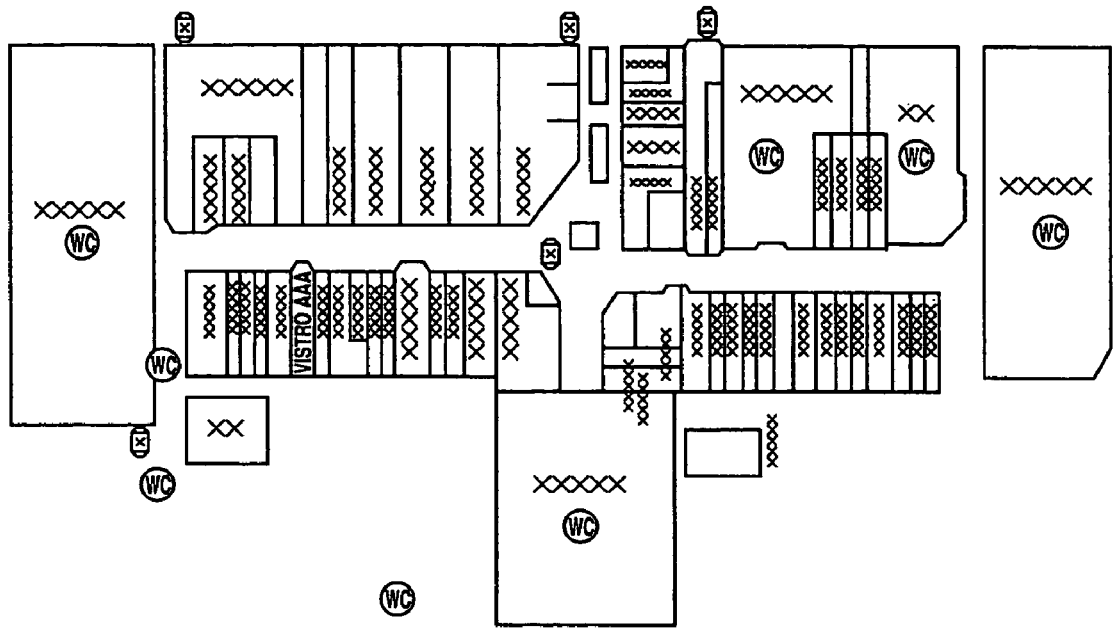
FIG. 3 shows an in-hall view image (overall view) referred to by a guide information providing program embodying the present invention.
Figure 4:
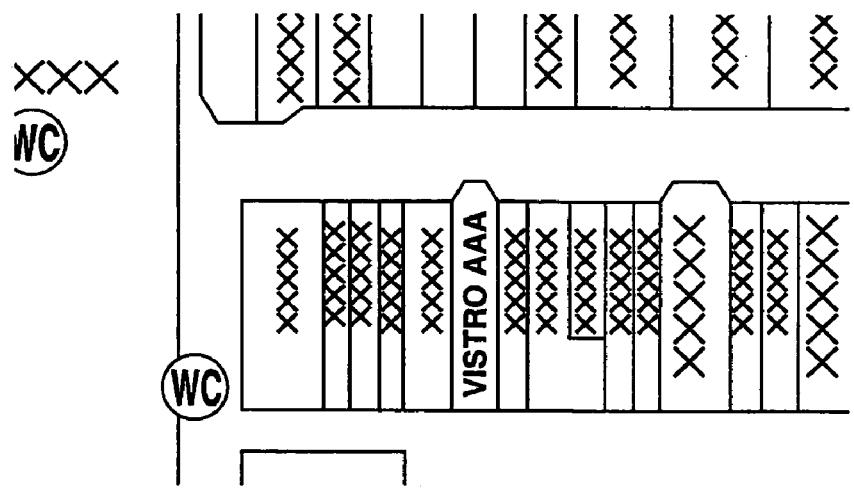
FIG. 4 shows an in-hall view image (enlarged view) referred to by the guide information providing program embodying the present invention.

The in-hall view image is a two dimensionally expressed image expressing the locations of the alleys or stores in the hall in order to permit visual recognition of the locations of the alleys and stores in the hall of the representative establishment, for guiding the locations of the POIs in the representative establishment. The guide information providing program 10 registers the in-hall view image for each floor of the representative establishment, such as lower ground, first floor or the second floor. That is, the guide information providing program 10 registers in-hall view images, such as an in-hall view of the first floor of a representative establishment A, an in-hall view of the second floor of the representative establishment A, an in-hall view of the first floor of a representative establishment B, an in-hall view of the second floor of the representative establishment B, and so forth. The guide information providing program 10 also registers two sorts of the in-hall view images, that is, the "overall view" and the "enlarged view" for the same floor of the same representative establishment. The overall view is such a view with a scale such that a given floor in its entirety may be represented on the small-sized display panel 4 of the PDA 1, as shown in FIG. 3. The enlarged view is sufficiently enlarged as compared to the overall view and is such a view with a scale such that the relative positions of POIs (sites or establishments) on a given floor may be sufficiently visually comprehended when displayed on the small-sized display panel 4 of the PDA 1. Although FIG. 4 shows only a portion of the enlarged view, FIG. 4 shows an area displayed on the display panel 4, while data for one image stored in the memory card 11 includes images of ambient areas.

In each in-hall view image, XY coordinates are set on the image. For example, coordinates are set in the X-direction and in the Y-direction from the center position of the in-hall view image as a point of origin. By setting the coordinates in the X- and Y-directions, a marker, such as an icon, may be represented at a particular XY coordinate position on the displayed in-hall view image. For example, the "coordinate position on the displayed in-hall view image" is stated in the POI-related information, and hence a marker specifying a particular POI position may be represented on the in-hall view image. It is noted that there are two sorts of the in-hall view images, namely an overall view and an enlarged view.

For this reason, the XY coordinates are set with one of the views as a reference, such that, with the other view, correction is made depending on the scale enlarging or reducing ratio from the reference view. That is, the XY coordinate is corrected for the other view so that, given the same XY coordinate, the same establishment may be specified on the in-hall view.

The above-described map image is formed into data in e.g. the GIF form and stored as such in the memory card 11.

Processing Contents of the Guide Information Providing Program

The processing contents of the guide information providing program 10 are now explained as the view images under respective situations are shown in the drawings.

The guide information providing program 10 selects a sole POI at all times as from the time of booting until the end of the booting. The POI is selected responsive to the user selection. The sole POI, selected by the guide information providing program 10, is referred to below as an "active POI". Meanwhile, directly after the booting, the guide information providing program 10 activates the POI which was activated when the previous operation was finished. On the other hand, the guide information providing program 10 detects the own position (latitude and longitude) as detected by the GPS communication unit 13, as from the time of booting until the end of booting. The own position (latitude and longitude) as detected by the GPS communication unit 13 is referred to below as the current position.

(Basic Viewing Surface)

First, the basic viewing surface is explained. When booted, the guide information providing program 10 demonstrates a basic viewing surface 20, shown in FIGS. 5 and 6, on the display panel 4.

Figure 5:
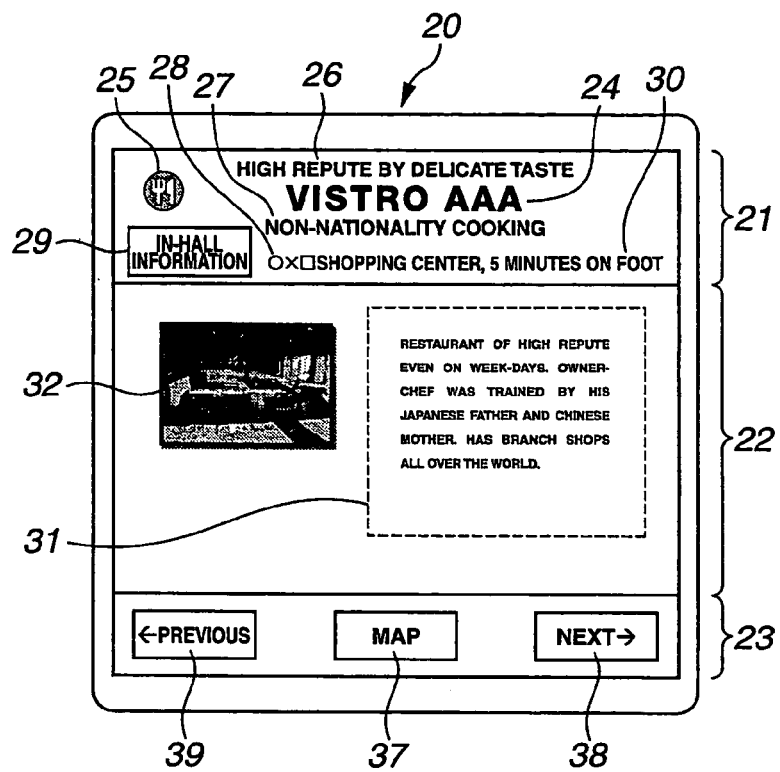
FIG. 5 shows a display state of a basic viewing surface demonstrated by the guide information supplying program (POI display mode).
Figure 6:
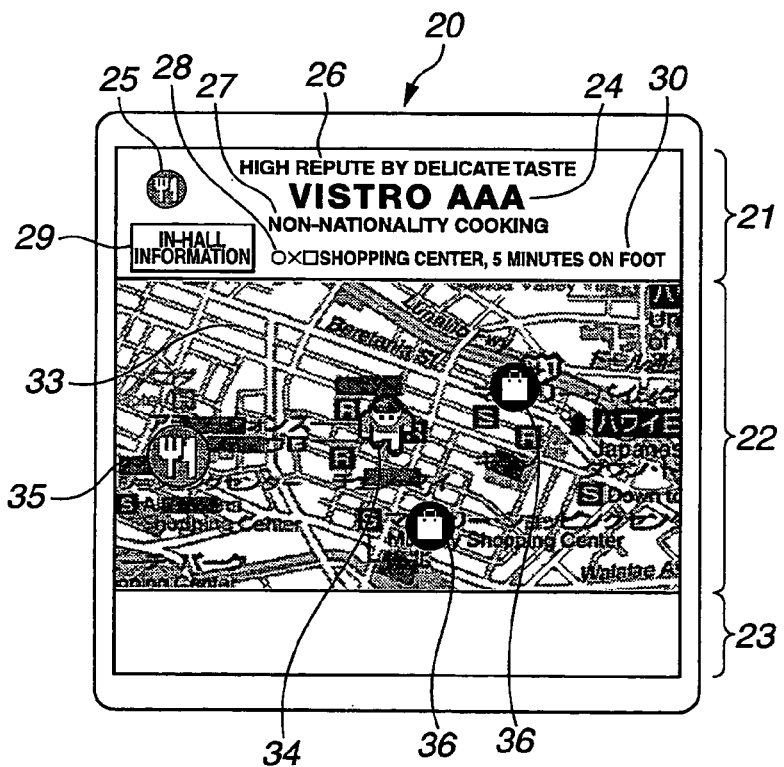
FIG. 6 shows a display state of a basic viewing surface demonstrated by the guide information supplying program (map image display mode).

The basic viewing surface 20 is split into three zones along the vertical direction, as shown in FIGS. 5 and 6. These three zones are an upper display zone 21, a main display zone 22 and a button display zone 23, looking from above.

The upper display zone 21 demonstrates a part of the POI-related information of the active POI. Specifically, the upper display zone 21 demonstrates a name of the active POI 24, an icon indicating the category 25, a catch copy 26, and a detailed category 27. If the POI is the POI in the representative establishment, a name of the representative establishment 28 and an in-hall information button 29, as a GUI for demonstrating the in-hall information viewing surface, are demonstrated. The in-hall information viewing surface will be explained in detail subsequently. The guide information providing program 10 calculates the distance and the route from the current position, based on the current position as detected by the GPS communication unit 13 and on the latitude and the longitude stated in the POI-related information of the active POI, and estimates the time needed until reaching the active POI as from the current site. The upper display zone 21 also demonstrates the estimated time needed 30.

The guide information providing program 10 sets two modes, namely the relevant information display mode and the map image display mode, as display modes for the basic viewing surface 20, and switches the display contents of the basic viewing surface 20, depending on the modes.

The main display zone 22 displays part of the POI-related information, as shown in FIG. 5, when the display contents are switched to the relevant information display mode, while displaying a map image 33, as shown in FIG. 6, when the display contents are switched to the map image display mode.

In the POI-related information displaying mode, a legend 31 and an introducing photo 32, shown in the POI-related information of the active POI, are demonstrated, as shown in FIG. 5.

When the display mode is the map image display mode, the map image 33 is demonstrated in the main display zone 22, as shown in FIG. 6.

On the map image 33, a current position icon 34, indicating the current position, is demonstrated. The map image 33 is correlated with the XY coordinate and with the latitude and the longitude. Thus, the guide information providing program 10 is able to display the current position icon 34, that is, a marker indicating the current position, on the corresponding position on the map image 33, in superposition, based on the current position latitude and longitude) as detected by the GPS. On the map image 33, an active POI icon 35, indicating the position of the active POI, and nonactive POI icons 36, indicating the positions of the POIs other than the active POI, are displayed. Based on the correlation of the XY coordinates with the latitude and the longitude of the map image 33, the guide information providing program 10 is able to display an active POI icon 35 and nonactive POI icons 36, stated in the POI-related information, as markers indicating the POI positions, at the corresponding positions on the map image 33, based on the POI positions latitude and longitude) indicated in the POI-related information.

In case the active POI icon 35 and the non-active POI icons 36 are differentially represented in keeping with the POI category, the corresponding information may be transmitted more comprehensively to the user. For example, if the POI category is a restaurant, or a bag shop, the icon is preferably an icon indicating a knife and a fork, or an icon indicating a bag, respectively.

In a button display zone 23, GUI buttons for various operations of the guide information providing program 10 are displayed. When a user touches these buttons, with the input pen 3, preset functions allocated to these buttons are executed. The functions corresponding to the various buttons will be explained later.

(Operations on a Basic Viewing Surface)

The operations on the basic viewing surface 20 are now explained.

Figure 7:
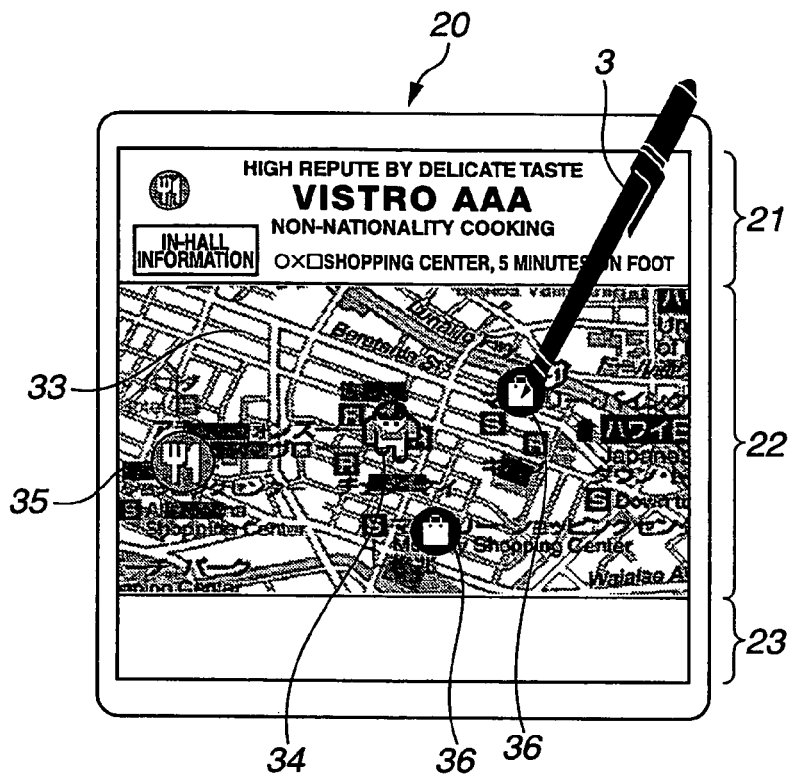
FIG. 7 shows a display state when the basic viewing surface is demonstrated in the map image display mode and a nonactive POI icon has been touched.

It is first assumed that, in the map image display mode, the user has touched the nonactive POI icon 36 with the input pen 3, as shown in FIG. 7. When the nonactive POI icon 36 is touched, the guide information providing program 10 activates the so touched POI, while changing the display contents of the upper display zone 21 and switching the display of the active OI icon 35 and the non-active POI icon 36, as shown in FIG. 8.

Figure 8:
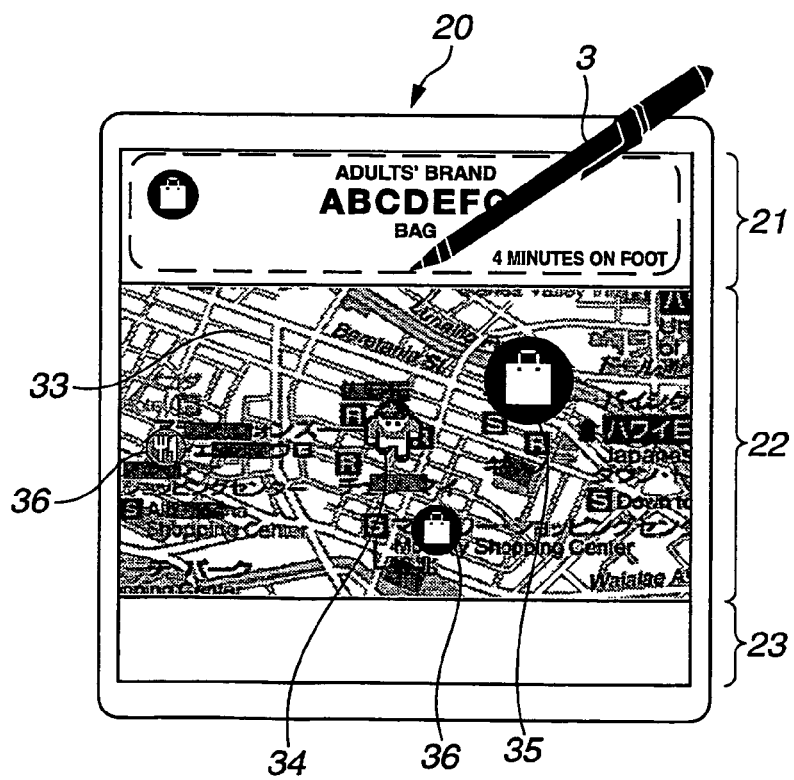
FIG. 8 shows a display state when the basic viewing surface is demonstrated in the map image display mode and an upper display area has been touched.
Figure 9:
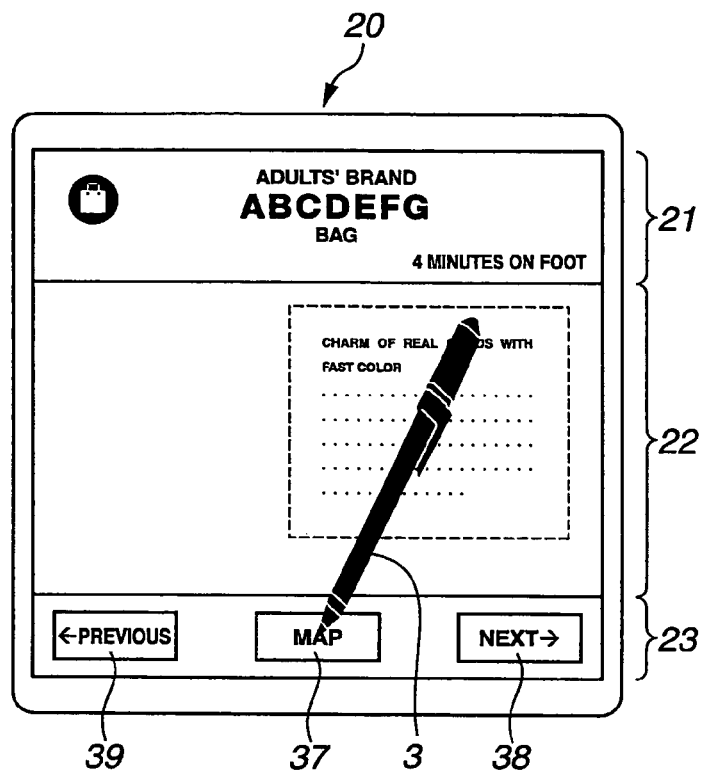
FIG. 9 shows a display state when the basic viewing surface is demonstrated in the POI display mode and a map button in a button display area has been touched.

It is now assumed that, in the map image display mode, the user has touched the upper display zone 21 with the input pen 3, as shown in FIG. 8. If, in the map image display mode, the upper display zone 21 is touched, the guide information providing program 10 changes the mode to the POI-related information display mode, while switching the display contents of the main display zone 22 to the legend 31 and the introducing photo 32 for the POI-related information, as shown in FIG. 9.

Figure 10:
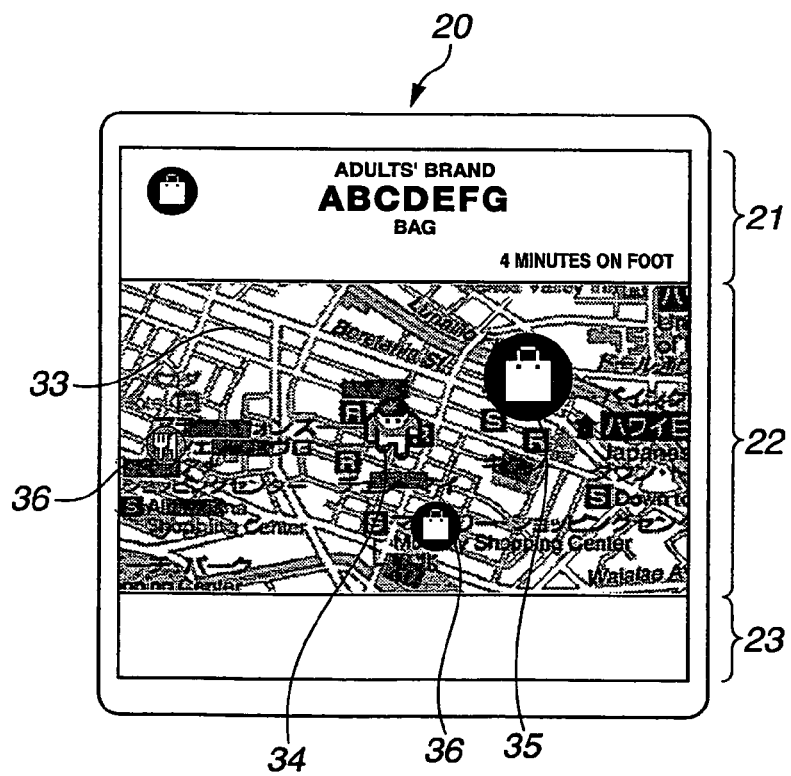
FIG. 10 shows a display state of the basic viewing surface in the map image display mode.

It is assumed that, in the POI-elated information demonstrating mode, the user has touched the upper display zone 21. When a map button 37 is touched, the guide information providing program 10 changes the display mode to the map image display mode, while switching the display contents of the main display zone 22 to the map image 33, as shown in FIG. 10.

Figure 11:
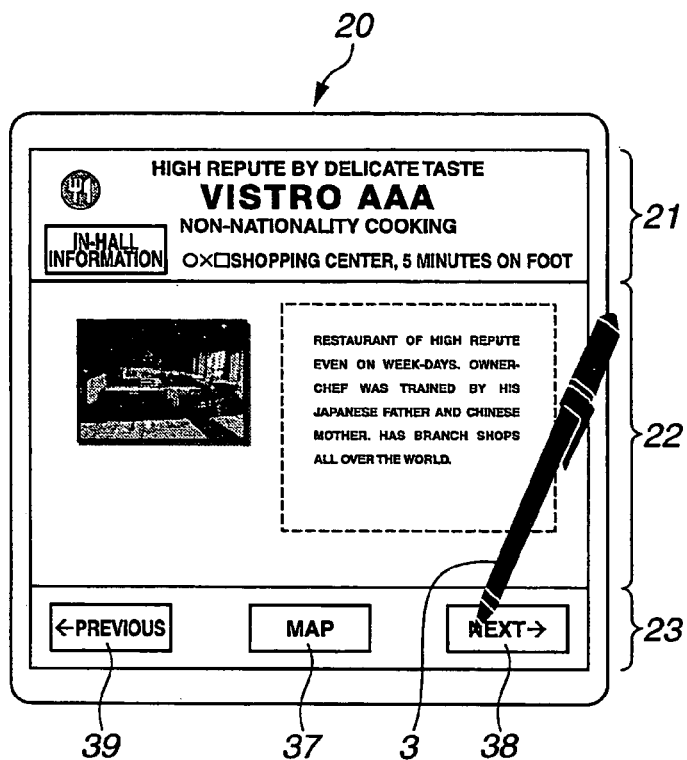
FIG. 11 shows a display state when the basic viewing surface is demonstrated in the POI display mode and a page feed button of a button display area is touched.
Figure 12:
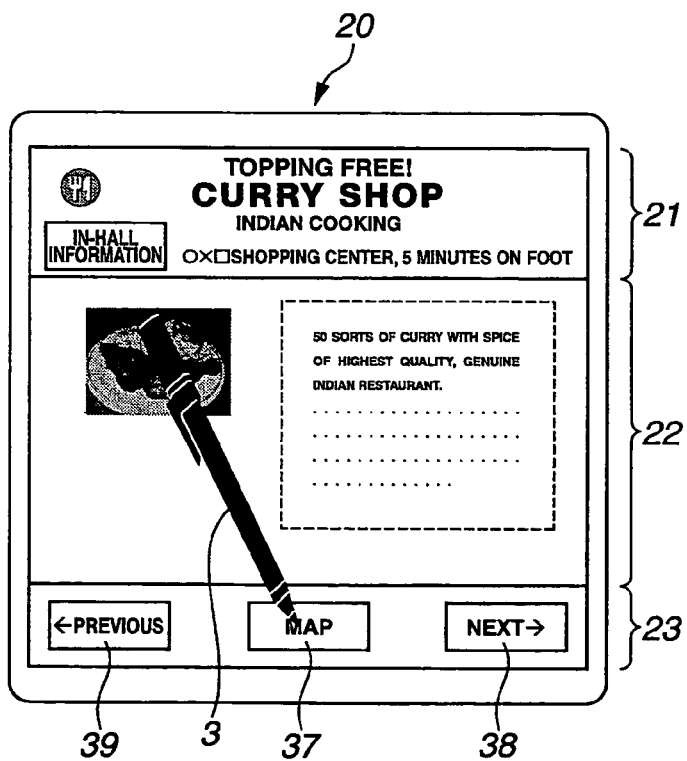
FIG. 12 shows a display state when another POI is active, the basic viewing surface is demonstrated in the POI display mode and a map button in a button display area has been touched.
Figure 13:
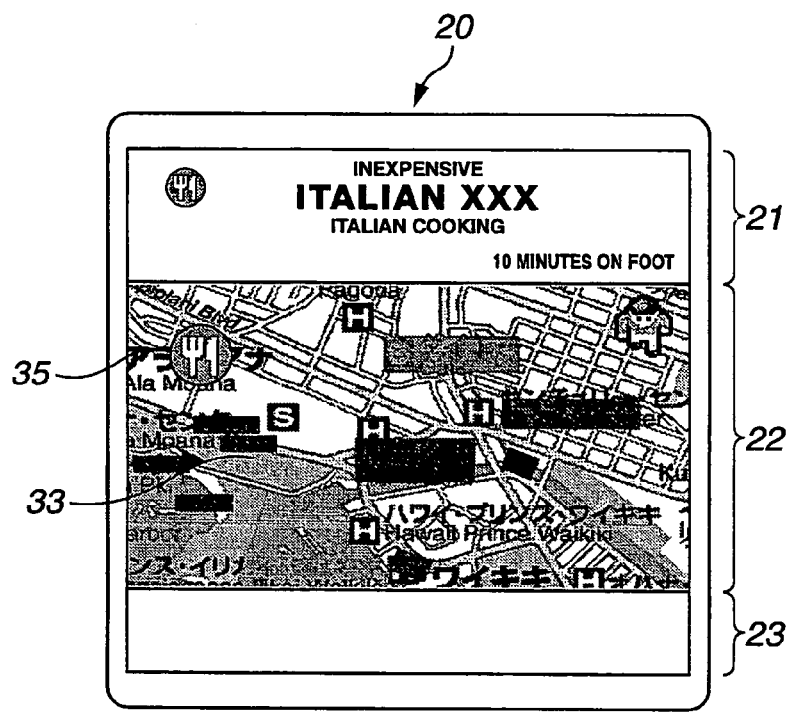
FIG. 13 shows a display state of a basic viewing surface in the map image display mode when another POI is active.
Figure 14:
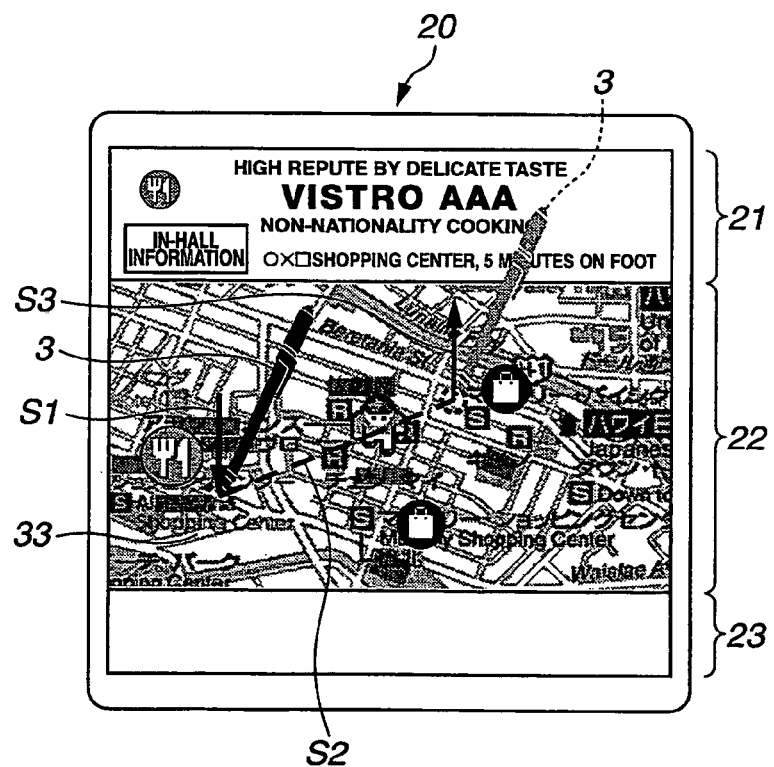
FIG. 14 shows a state in which, in case a map image is slid on the basic viewing surface, the map image is not as yet slid.

It is now assumed that, when the display mode is the POI-related information demonstrating mode, the user has touched a page feed button 38 or a page return button 39 of the button display area with the input pen 3, as shown in FIG. 11. When the page feed button 38 or the page return button 39 is touched in this manner, the guide information providing program 10 selects and activates the POI next following or directly preceding the active one of the POIs, sorted and supervised in a preset sequence, while changing the display contents of the upper display zone 21 and the main display zone 22, as shown in FIG. 12. If, after page feed or page return of the POI-related information, in the POI-related information demonstrating mode, the display mode is switched to the map image display mode, and there is no POI in the original map, the guide information providing program 10 changes the map image 33 displayed, as shown in FIG. 13.

Figure 15:
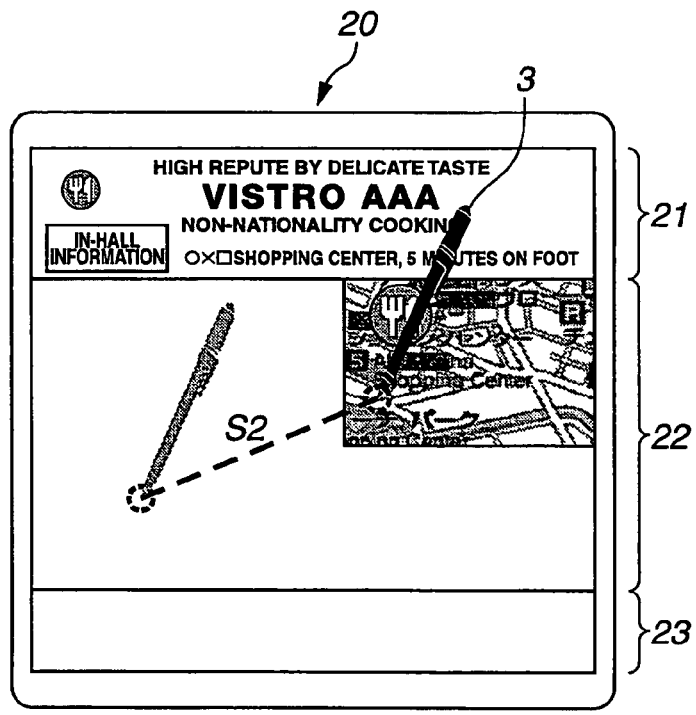
FIG. 15 shows a state in which, in case a map image is slid on the basic viewing surface, the map image is being slid.
Figure 16:
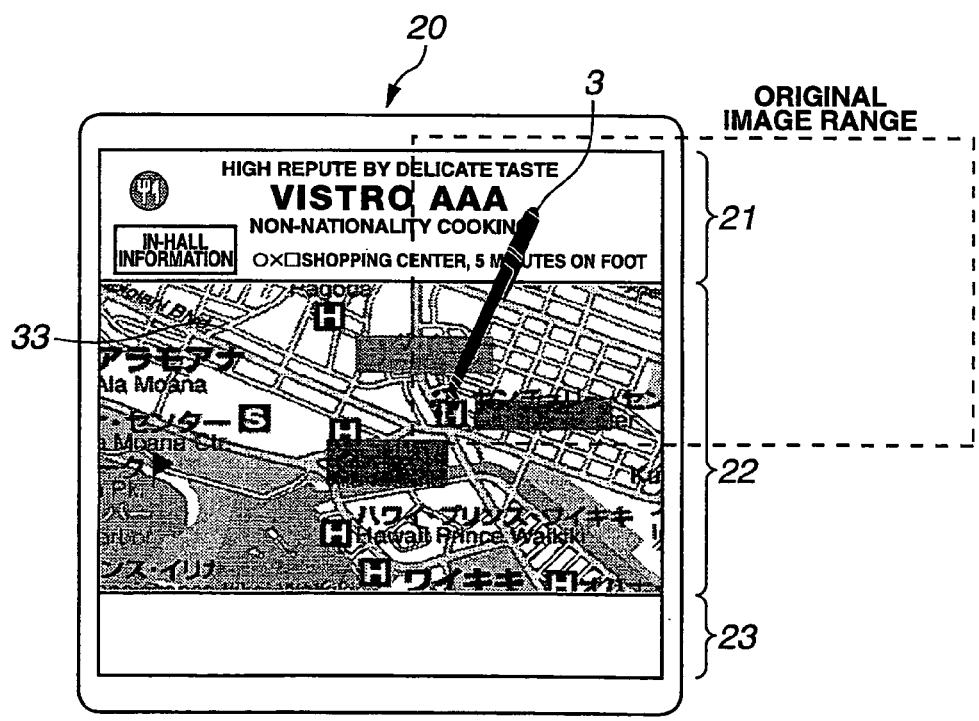
FIG. 16 shows a state in which, in case a map image is slid on the basic viewing surface, the map image has been slid.

In the map image demonstrating mode, the guide information providing program 10 is also able to scroll the displayed map image 33 in the up-and-down and in the left-and-right directions. For scrolling the map image 33 in the up-and-down and in the left-and-right directions, the input pen 3 is placed on the map image 33 (S1) and is then moved in the desired slide direction (S2). An image of the map image 33 is then moved to follow up with the input pen 3, as shown in FIG. 15. When the input pen 3 is moved away from the map image (S3), the as -scrolled map image is displayed, as shown in FIG. 16.

If, in the map image demonstrating mode, there exist plural POIs at the same position, the display of the active OI icon 35 is overlapped with that of the nonactive POI icon 36. In such case, the guide information providing program 10 switches the display of the icon, demonstrated on the foreground, each time an icon to be displayed in superposition is tapped with the input pen 7.

(In-hall Information List)

The display of a list image of the POIs within the representative establishment is hereinafter explained.

The guide information providing program 10 is able to display the information of the representative establishment for the user.

Figure 17:
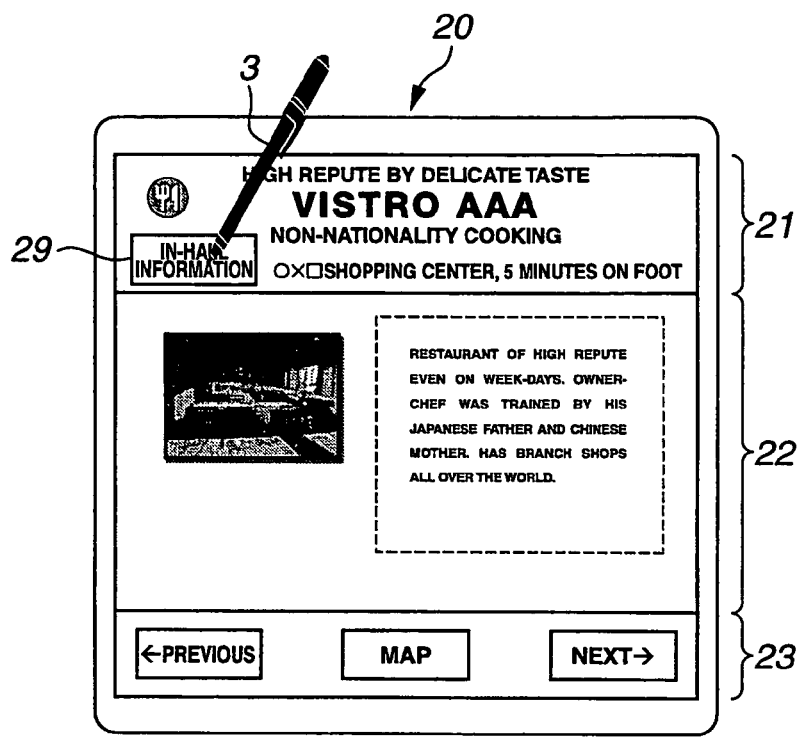
FIG. 17 shows the display state when an in-hall information button displayed in an upper display area of the basic viewing surface is touched.
Figure 18:
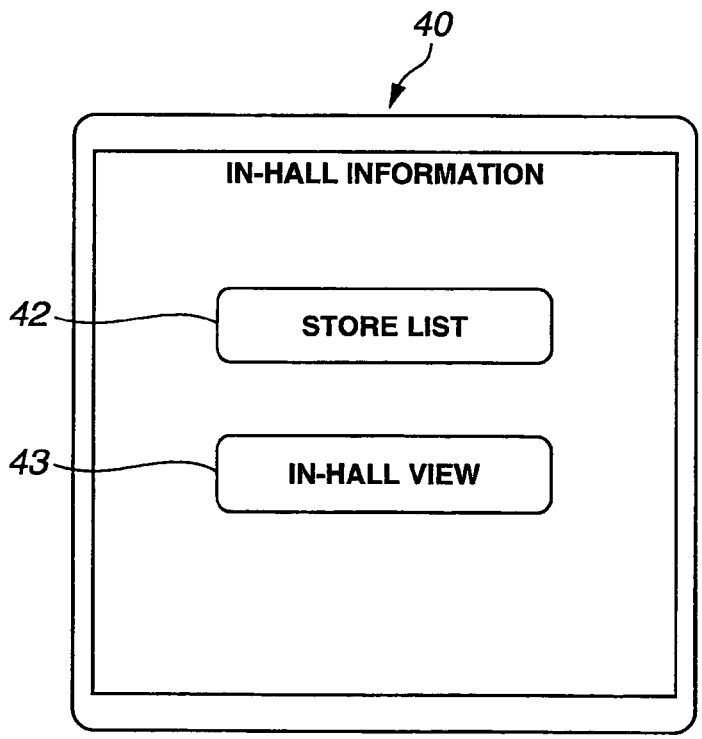
FIG. 18 shows a main image of the in-hall information.
Figure 19:
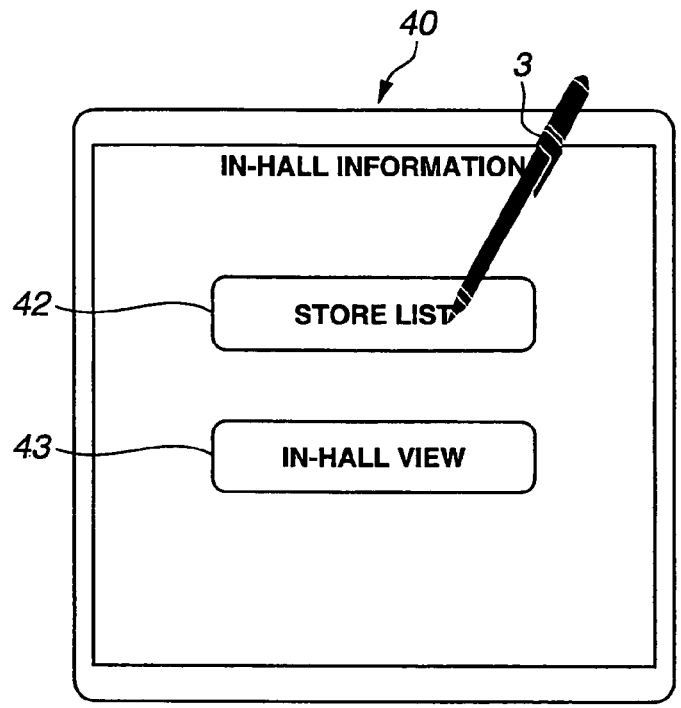
FIG. 19 shows the display state when a store list button on a main viewing surface for the in-hall information has been touched.

When the user has touched the in-hall information button 29, demonstrated on the upper display zone 21 of the basic viewing surface 20, with the input pen 3, as shown in FIG. 17, an in-hall information main viewing surface 40, shown in FIG. 18, is displayed. On the in-hall information main viewing surface 40, a store list button 42 and an in-hall view button 43 are displayed.

Figure 20:
FIG. 20 shows a store list viewing surface.

It is assumed that, when the in-hall information main viewing surface 40 is being displayed, the user has touched the store list button 42. When the store list button 42 is touched, the guide information providing program 10 displays a store list viewing surface 45, showing a list of the names of the POIs, present in a representative establishment in question, as shown in FIG. 20.

On the store list viewing surface 45, names of POIs and category icons, sorted from one floor of the representative establishment to another and from one store name to another, are displayed in a list. On the store list viewing surface 45, a detail button 46 and a map button 47 are displayed as operating buttons.

Figure 21:
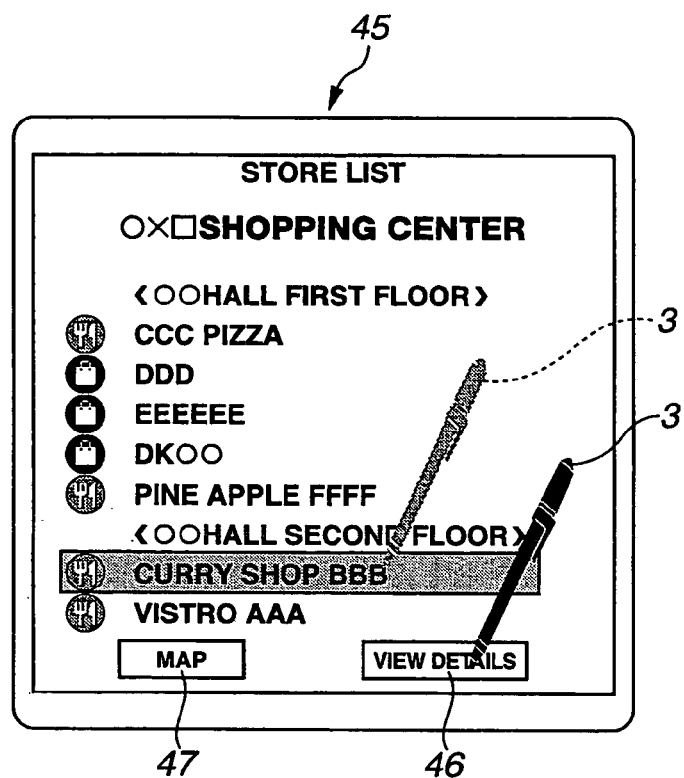
FIG. 21 shows a display state when a button for viewing details of the store list viewing surface has been touched.
Figure 22:
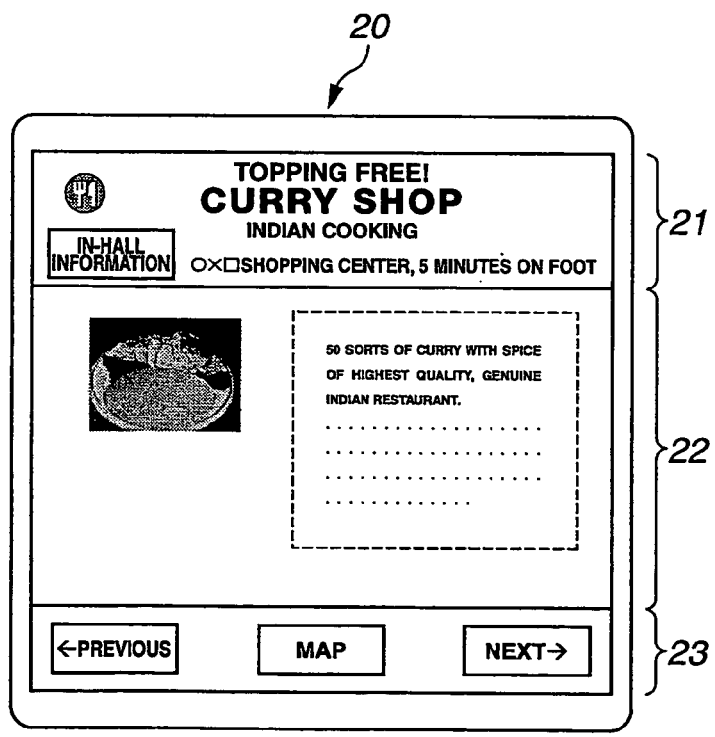
FIG. 22 depicts a basic viewing surface (POI display mode) demonstrated on touching a button for viewing details of a store list viewing surface.

It is assumed that, when the store list viewing surface 45 is demonstrated and one of the POIs in the POI list is highlighted, the user has touched the detail button 46 with the input pen 3, as shown in FIG. 21. When the detail button 46 is touched, the guide information providing program 10 activates the so highlighted POI and demonstrates the basic viewing surface 20 of the POI-related information demonstrating mode, as shown in FIG. 22.

Figure 23:
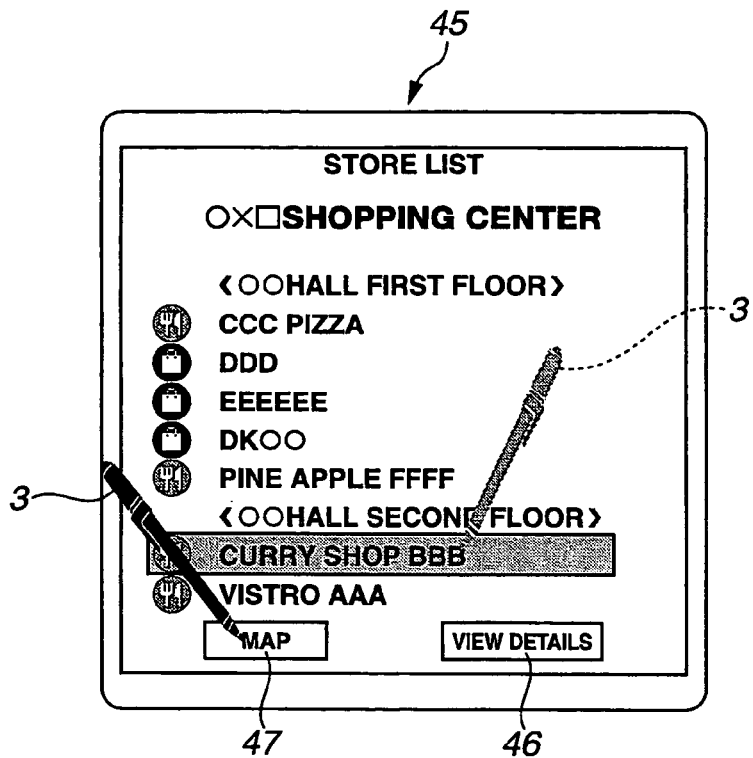
FIG. 23 shows a display state when a map button of the store list viewing surface has been touched.
Figure 24:
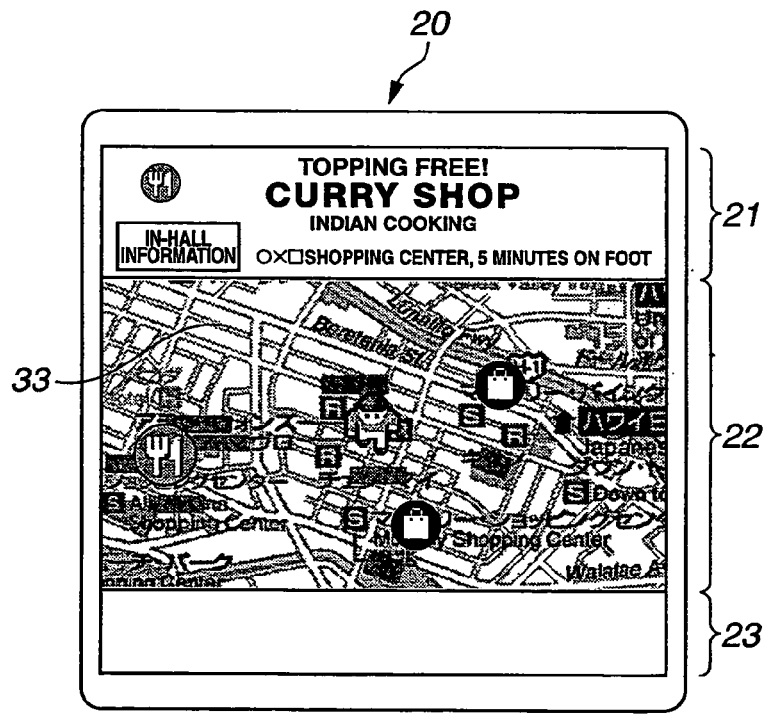
FIG. 24 shows a basic viewing surface (map image display mode) demonstrated on touching a map button on the store list viewing surface.

It is assumed that, when the store list viewing surface 45 is displayed, and one of the POIs in the Poi list is highlighted, the user has touched the map button 47 with the input pen 3, as shown in FIG. 23. When the map button 47 is touched, the guide information providing program 10 activates the so highlighted POI and demonstrates the basic viewing surface 20 of the map view display mode, as shown in FIG. 24.

As described above, the guide information providing program 10 is able to display not only the POI appearing on a map, but also POIs in a complex of establishments, such as building, department store or shopping mall, readily comprehensively for the user.

(In-hall Viewing Surface)

The in-hall viewing surface of a representative establishment is now explained.

Figure 25:
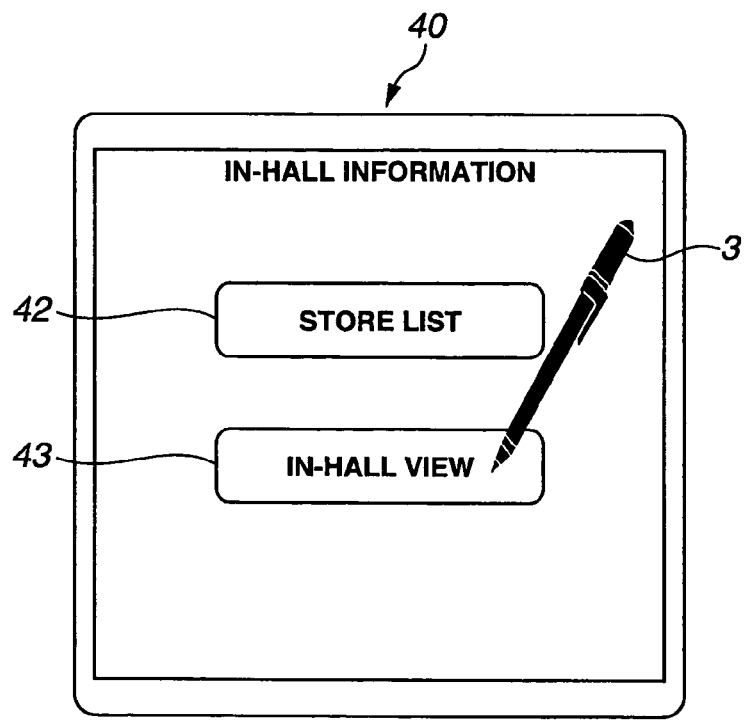
FIG. 25 shows a display state when the in-hall view image of the in-hall information main viewing surface has been touched with an input pen.
Figure 26:
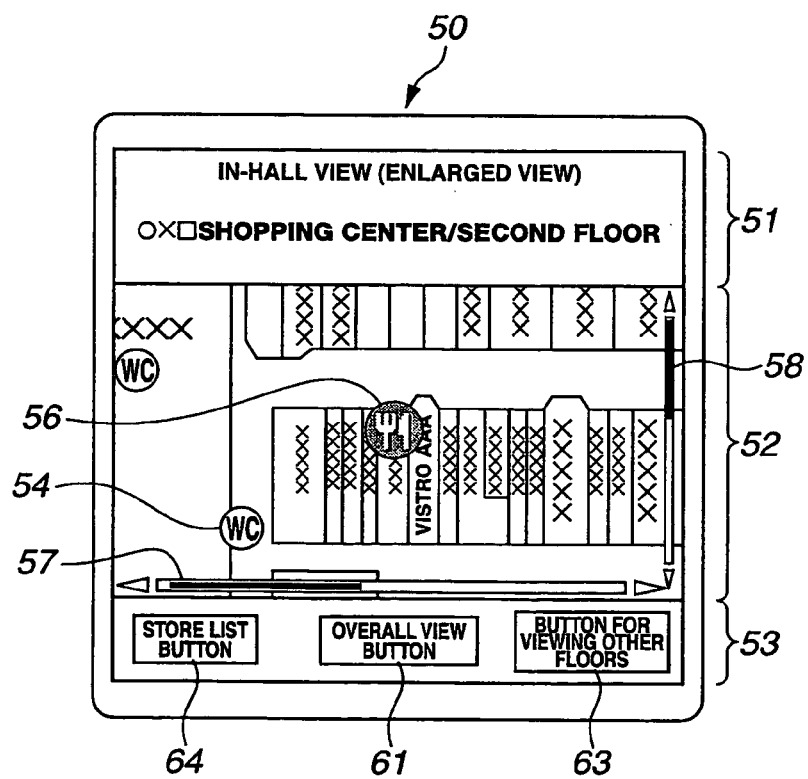
FIG. 26 shows an in-hall view image (enlarged view mode).
Figure 27:
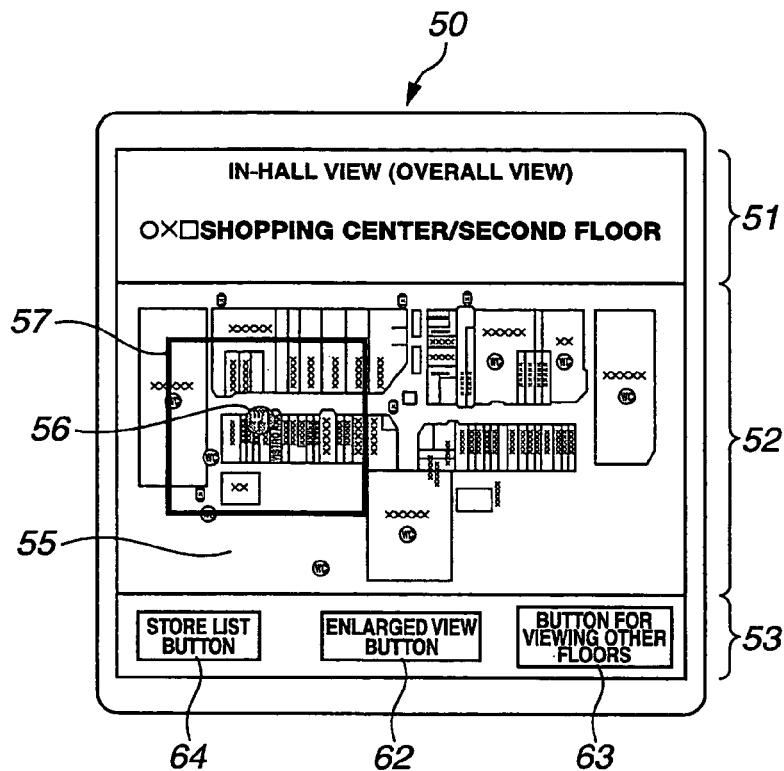
FIG. 27 shows an in-hall view image (overall view mode).

If, as the main viewing surface 40 for the in-hall information is displayed, the user has touched the in-hall view button 43 with the input pen 3, as shown in FIG. 25, an in-hall viewing surface 50, shown in FIG. 26 or 27, is displayed.

The in-hall viewing surface 50 is split into three zones, in the vertical direction, as shown in FIGS. 26 and 27. These zones are an upper display zone 51, a main display zone 52 and a button display zone 53, looking from above.

In the upper display zone 51, the title/floor number of the currently selected in-hall view is displayed.

The guide information providing program 10 sets two modes, that is, an enlarged view display mode and an overall view display mode, as a display mode of the in-hall viewing surface 50, and switches the display contents of the in-hall viewing surface 50, depending on the modes.

In the enlarged view mode, an enlarged view 54, as in-hall view image, is displayed in the main display zone 52, as shown in FIG. 26. In the overall view mode, an overall view 55, as in-hall view image, is displayed in the main display zone, as shown in FIG. 27.

In the main display zone 52, in the in-hall view image (enlarged view 54 or overall view 55), an active POI icon 56, indicating the in-hall position of the active POI, is displayed. In the in-hall view image (enlarged view 54 or overall view 55), XY coordinates are set. Thus, the guide information providing program 10 is able to display the active POI icon 56, as a marker indicating the POI position, in superposition, at a corresponding position on the in-hall view image, based on the "XY coordinate position on the in-hall view image" stated in the POI-related information.

However, in case an in-hall view image of a floor different from the floor where the active POI exists, or an in-hall view image of a representative establishment, different from a representative establishment where the active POI exists, the active POI icon 56 is not displayed. The guide information providing program 10 refers to the name and the floor number of the representative establishment stated in the POI-related information of the active POI to determine whether or not the active POI icon 56 is to be displayed for the currently displayed in-hall view image. That is, if the name and the floor number of the representative establishment of the in-hall view image displayed coincide with those of the active POI, the guide information providing program 10 demonstrates the active POI icon 56. Since plural floor numbers are stated in the POI-related information in the case of the so-called maisonette, the guide information providing program 10 states the active POI icon 56 for each of the in-hall view images of the plural floors.

Meanwhile, in case the active POI icon 35 is designed to make different display in keeping with the POI category, the information can be more comprehensively transmitted to the user. For example, if the POI category is a restaurant, or a bag shop, the icon is preferably an icon indicating a knife and a fork, or an icon indicating a bag, respectively.

For the enlarged view mode, a slider for the transverse direction 57 and a slider for the vertical direction 58 are displayed, along with the enlarged view 54, in the main display zone 52. The enlarged view 54 is shown not in its entirety but only partially in the main display zone 52. The slider for the transverse direction 57 is displayed in a transversely extending state below the enlarged view 54 for indicating the extent of the transverse display portion of the enlarged view 54 in its entirety. The slider for the vertical direction 58 is displayed in a vertically extending state on the transversely right side of the enlarged view 54 for indicating the extent of the vertical display portion of the enlarged view 54 in its entirety. The enlarged view 54, displayed in the main display zone 52, may be scrolled in the up-and-down direction and in the left-and-right direction. For scrolling in the up-and-down direction and in the left-and-right direction, it is sufficient to actuate the slider for the transverse direction 57 and the slider for the vertical direction 58 or to place the input pen 3 on the enlarged view 54 and to slide the input pen 3 in the desired direction for movement.

In the overall view mode, a cursor 57, indicating the display range of the enlarged view 54, is demonstrated in the main display zone 52.

In the button display zone 53, GUI buttons for actuation of the guide information providing program 10 are displayed. Specifically, an overall view button 61, a button for viewing other floors 63 and a store list button 64 are displayed for the enlarged view mode, whilst an enlarged view button 62, the button for viewing other floors 63 and the store list button 64 are displayed for the overall view mode. When the user touches these buttons with the input pen 3, the guide information providing program 10 executes the preset functions allocated to the buttons. The functions associated with these buttons will be explained subsequently.

(Operations on the In-hall Image)

If, in case the in-hall information main viewing surface 40 is demonstrated, as shown in FIG. 25, the user touches the in-hall view button 43 with the input pen 3, the guide information providing program 10, holding the currently active POI, displays the in-hall viewing surface 50 with the enlarged view mode. In this case, the guide information providing program 10 refers to the "name of the representative establishment" and the "floor number" stated in the POI-related information of the active POI to read out the corresponding in-hall view image (enlarged view 54) from the memory card 11. The guide information providing program 10 refers to the "XY coordinate position on the in-hall view image" stated in the POI-related information to display the corresponding XY coordinate position of the in-hall view image (enlarged view 54) at the center of the main display zone 52, and to display the active POI icon 56, indicating the in-hall position of the active POI, at the center of the main display zone 52.

Figure 28:
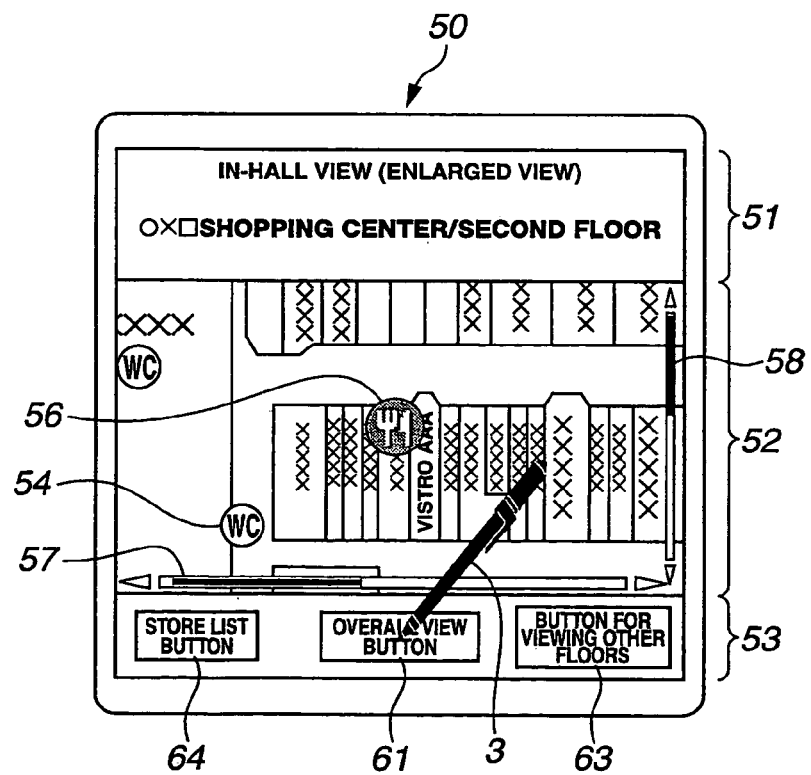
FIG. 28 shows the display state when an overall view button has been touched in the in-hall viewing surface (enlarged view mode).
Figure 29:
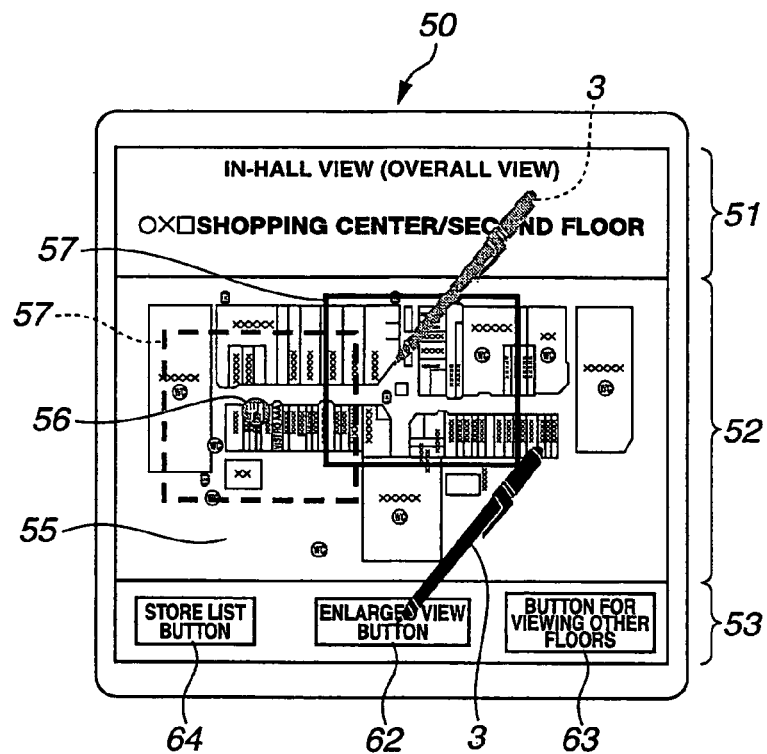
FIG. 29 shows the display state when an enlarged view button has been touched in the in-hall viewing surface (overall view mode).

It is assumed that, in the enlarged view mode, the user has touched the overall view button 61 with the input pen 3, as shown in FIG. 28. When the overall view button 61 has been touched in this manner, the guide information providing program 10 changes the mode to the overall view mode and switches the display contents of the main display zone 52 to the overall view 55, as shown in FIG. 29. In this case, the cursor 57, displayed on the overall view 55, is displayed at a position centered on the active POI icon 56.

Figure 30:
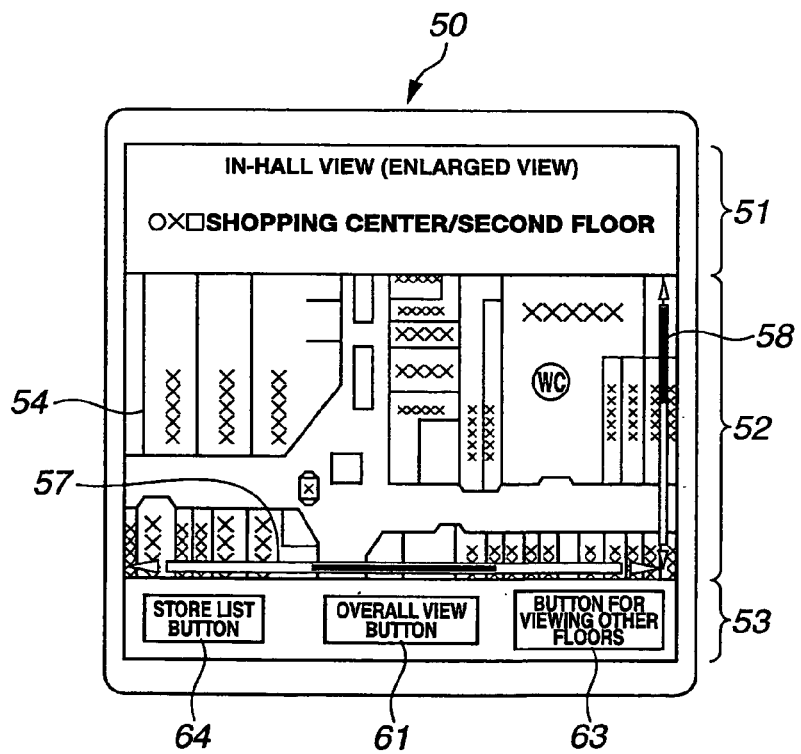
FIG. 30 depicts an in-hall view (enlarged view mode) when the display area has been moved.

In the overall view mode, the user is able to cause the cursor 57 to be slid to an optional position on the overall view 55, with the input pen 3, as shown in FIG. 29. It is now assumed that, in the overall view mode, the user has slid the cursor 57 by the input pen 3 to an optional position on the overall view 55 and subsequently touched the enlarged view button 62 by the input pen 3. When the enlarged view button 62 is touched in this manner, the guide information providing program 10 changes the mode to the enlarged view mode, and switches the display contents on the main display zone 52 to the enlarged view 54, as shown in FIG. 30. The guide information providing program 10 sets the display range of the enlarged view 54 to a range on the overall view 55 specified by the cursor 57. It is noted that, if there is no active POI in the display range, the guide information providing program 10 does not display the active POI icon 56.

Figure 31:
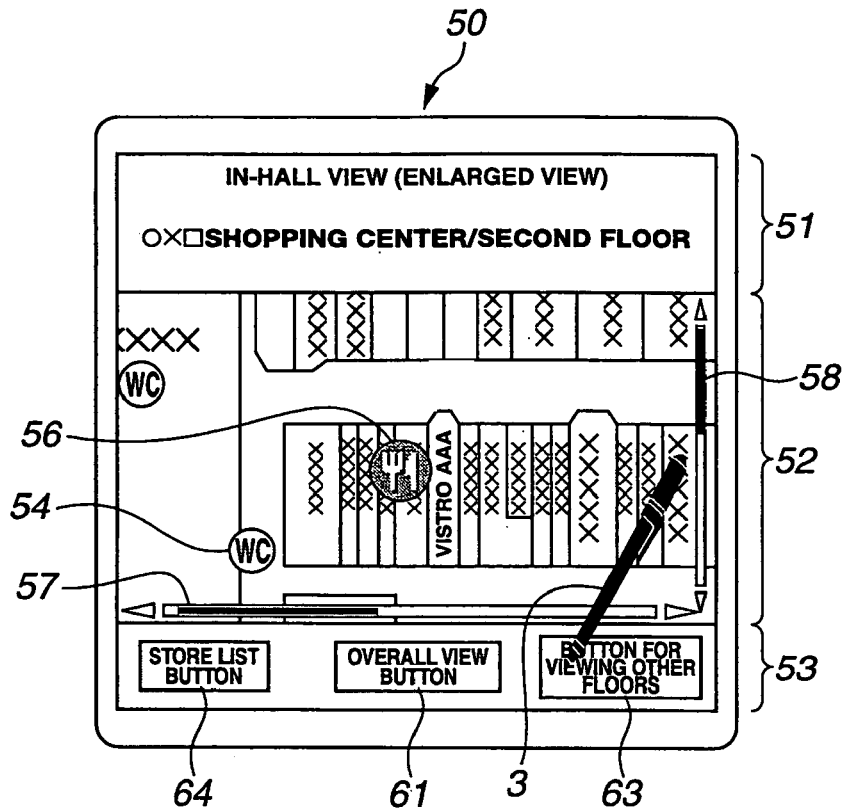
FIG. 31 shows a display state when the in-hall viewing surface is demonstrated and a button for viewing another floor has been touched.
Figure 32:
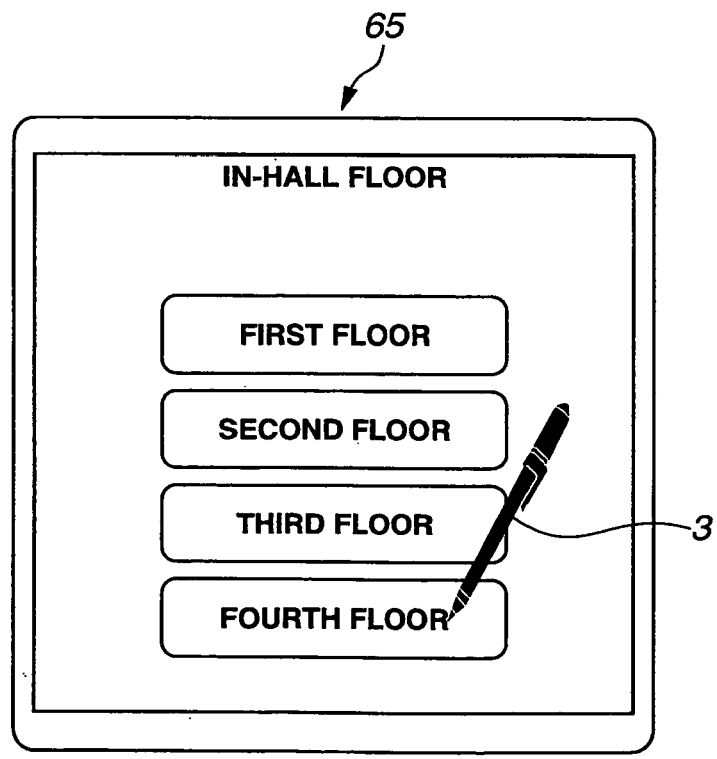
FIG. 32 shows an in-hall view floor selection viewing surface.
Figure 33:
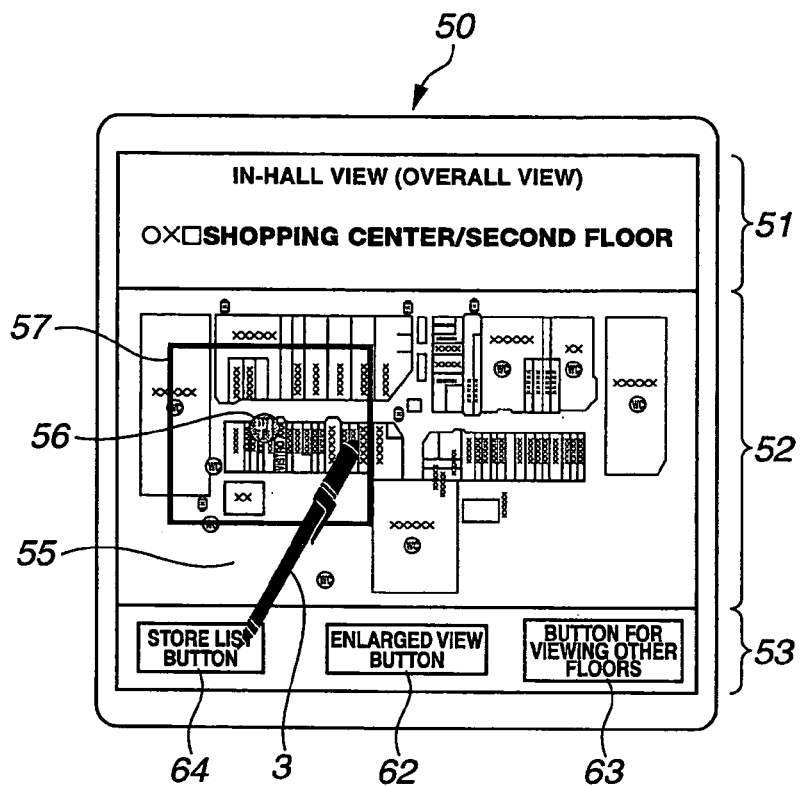
FIG. 33 shows a display state when the in-hall viewing surface is demonstrated and a button for viewing a store list button has been touched.

If, in the enlarged view mode or in the overall view mode, the user has touched the button for viewing other floors 63, with the input pen 3, as shown in FIG. 31. When the button for viewing other floors 63 has been touched in this manner, the guide information providing program 10 demonstrates an in-hall view floor selection viewing surface 65 shown in FIG. 32. In this in-hall view floor selection viewing surface 65, there are displayed plural buttons for indicating the total floor numbers of the representative establishment of the active POI. If, in case the in-hall view floor selection viewing surface 65 is displayed, the user has selected an optional floor, using the input pen 3, the guide information providing program 10 demonstrates the in-hall view image of the selected floor. If the viewing surface previous to the in-hall view floor selection viewing surface 65 is of the enlarged view mode, the enlarged vide 54 is displayed, whereas, if the viewing surface previous to the in-hall view floor selection viewing surface 65 is of the overall view mode, the overall view 55 is displayed.

Figure 34:
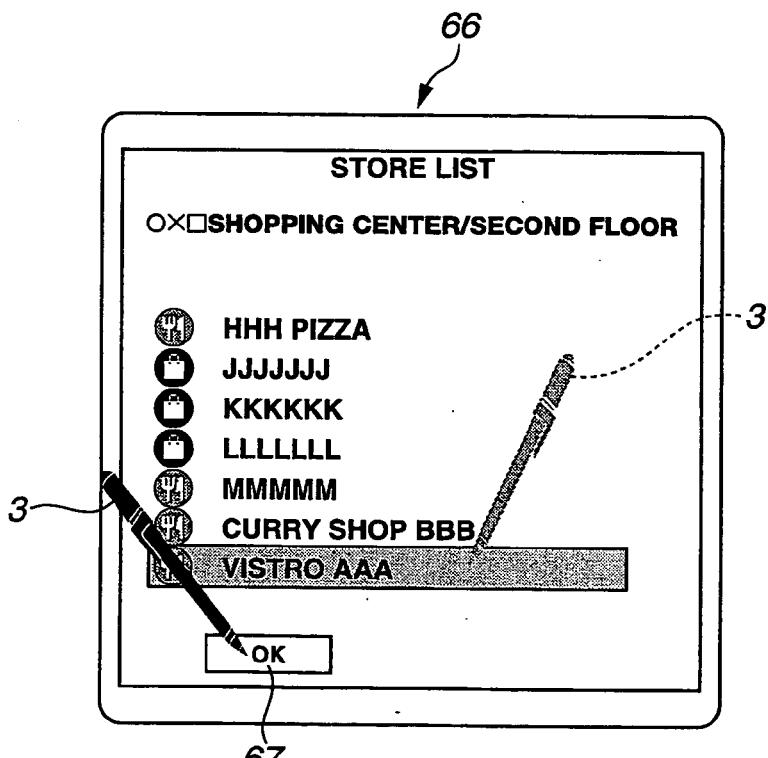
FIG. 34 shows a store list viewing surface.

It is now assumed that, with the enlarged view mode or the overall view mode, the user has touched the store list button 64 with the input pen 3. When the store list button 64 has been touched in this manner, the guide information providing program 10 demonstrates a store list viewing surface 66 displaying a list of the names of the POIs present on the floor, as shown in FIG. 34.

In the store list viewing surface 66, there is displayed a list of the name of the representative establishment, category icons and names of the POIs present on the current floor number. If, in this store list viewing surface 66, any one of the POIs is selected, the so selected POI is activated. The display reverts to the in-hall viewing surface 50 such that the enlarged view 54 or the overall view 55 is again displayed. In reverting from the store list viewing surface 66 to the enlarged view 54, the display range is controlled so that the active POI is located at the center of the viewing surface.

In the above-described guide information providing program 10, a guide image for the complex of establishments, such as a shopping center, is demonstrated as necessary, in addition to the usual map image, in order to allow the user to comprehend the POI position. Specifically, there are stated, in the POI-related information pertinent to the POIs present in the complex of establishments, the information identifying the complex of establishments, the floor where the POI exists, and the coordinate on the image in the complex of establishments where the POI exists.

When a map image is displayed, the POI position is displayed on the map, based on the latitude and longitude. If it is the image in the complex of establishments that is being displayed, the POI position is displayed on the guide image, based on the coordinates of the image in the complex of establishments.

Thus, in the guide information providing program 10, according to the present invention, the detailed position of the POI in the complex of establishments may be visually demonstrated for the user, even though the POI is located within the complex of establishments.

The case in which the guide information providing program has been installed in the PDA for practical use has been explained in the foregoing. A computer in which the program is installed may be car-laden in place of being portable. The present invention may be applied not only to such software program but also to a dedicated device having the guide information providing program installed thereon for providing the guide information for the user.

What is claimed is:

1. A guide information providing apparatus comprising
data holding means for storage or acquisition from outside over a network of a map image in which a coordinate position on an image is correlated with the latitude and the longitude, an image in a complex of establishments, as a guide view image for each floor of said complex of establishments, and the POI information, stating the information pertinent to a sites and an establishment;
display means for demonstrating said map image, the image in the complex of establishments and the POI information; and
control means for controlling the contents demonstrated on said display means;
said POI information stating the name and the latitude/longitude of the site and the establishment; the POI information, pertinent to the establishment present in the complex of establishments, further stating the complex of establishments where the establishment exists, the floor where the establishment exists, and the coordinate on the image in the complex of establishments where the establishment exists;
said control means displaying said map image and an image in said complex of establishments responsive to input control from a user;
said control means displaying a marker for a point on the map image specified by the latitude/longitude stated in the POI information selected, when said map image is displayed;
said control means displaying a marker for a point on the image in the complex of establishments specified by the floor and the coordinates stated in the POI information selected, when said image in the complex of establishments is displayed.

2. The guide information providing apparatus according to claim 1 wherein
the image in said complex of establishments is an enlarged view of a preset scale ratio or an overall view of a scale ratio smaller than that of said enlarged view;
said control means when displaying said overall view displaying a cursor indicating a display range for said enlarged view and causing movement of a display position of said cursor responsive to input control by a user;
said control means displaying a position of said cursor on said overall view when a user has performed display switching control to said enlarged view.

3. The guide information providing apparatus according to claim 1 wherein
the POI information pertinent to an establishment present across plural floors of said complex of establishments states the plural floors across which said establishment exists.

4. A computer program for displaying for a user a map image in which a coordinate position on an image is correlated with the latitude and the longitude, an image in a complex of establishments, as a guide view image for each floor of said complex of establishments, and the POI information, stating the information pertinent to a site and an establishment; said computer program being stored in an information storage medium or supplied from outside over a network;
said POI information stating the name and the latitude/longitude of the site and the establishment; the POI information, pertinent to the establishment present in the complex of establishments, further stating the complex of establishments where the establishment exists, the floor where the establishment exists, and the coordinate on the image in the complex of establishments where the establishment exists;
said map image and the image in said complex of establishments being displayed responsive to input control from a user;
a marker being displayed for a point on the map image specified by the latitude/longitude stated in the POI information selected, when said map image is displayed;
a marker being displayed for a point on the image in the complex of establishments specified by the floor and the coordinates stated in the POI information selected, when said image in the complex of establishments is displayed.

5. The program according to claim 4 wherein
the image in said complex of establishments is an enlarged view of a preset scale ratio or an overall view of a scale ratio smaller than that of said enlarged view;
a cursor indicating a display range for said enlarged view is displayed, and a display position of said cursor is moved responsive to input control by a user, when said overall view is being displayed; and wherein
a position of said cursor on said overall view is displayed when a user has performed display switching control to said enlarged view.

6. The program according to claim 4 wherein
the POI information pertinent to an establishment present across plural floors of said complex of establishments states the plural floors across which said establishment exists.

* * * * *